Figure 1:
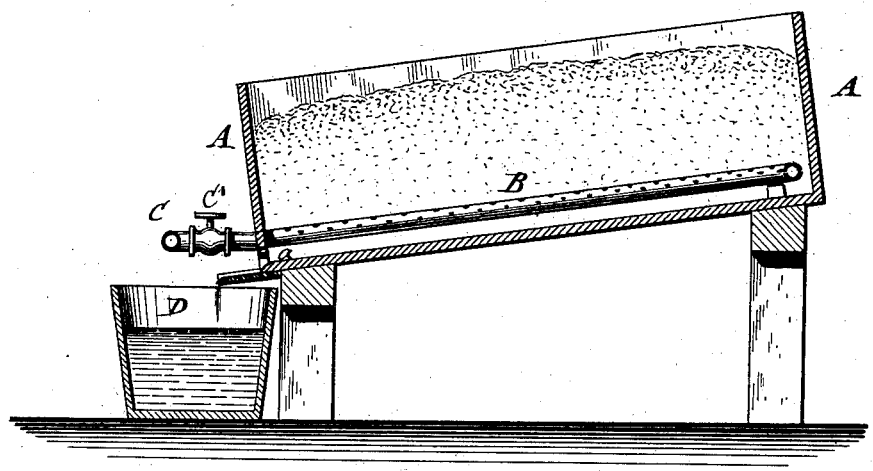

(No Model.)

G. G. CONVERS.
PROCESS OF TREATING SAL AMMONIAC OR FLUX SKIMMINGS.

No. 375,606. Patented Dec. 27, 1887.

WITNESSES:

INVENTOR
George G. Convers
BY
Goepel & Raegener
ATTORNEYS.

UNITED STATES PATENT OFFICE.

GEORGE G. CONVERS, OF BETHLEHEM, PENNSYLVANIA.

PROCESS OF TREATING SAL-AMMONIAC OR FLUX SKIMMINGS.

SPECIFICATION forming part of Letters Patent No. 375,606, dated December 27, 1887.

Application filed December 30, 1885. Serial No. 187,084. (No specimens.)

*To all whom it may concern:*

Be it known that I, GEORGE G. CONVERS, of Bethlehem, in the county of Northampton and State of Pennsylvania, have invented certain new and useful Improvements in Processes of Treating Sal-Ammoniac or Flux Skimmings, of which the following is a specification.

In galvanizing iron a coating or film of oxide of zinc, caused by its contact with the atmosphere, forms over the surface of the bath of molten zinc, which oxide would adhere to the galvanized iron as it is drawn from the bath, tarnish its brightness, and give it a rough surface if it were not prevented. This is accomplished by throwing some chloride of ammonia upon the bath just before and during the time the iron is being drawn from it. The chloride of ammonia combines with the oxide of zinc and does not adhere to the iron or injure its appearance, but leaves a black coating or scum floating on the surface of the bath, which is removed several times a day with a skimmer. This scum is called "sal-ammoniac" or "flux skimmings." It consists, principally, of chloride of zinc, with small shots or pellets of metallic zinc through it, and would be very valuable to zinc-manufacturers in its crude state—as an ore—were it not that the chloride of zinc, its principal constituent, is volatile at a red heat and passes off from the furnace in fumes or smoke, and becomes a total loss in the smelting process, which requires the ore to be raised to a high degree of heat. In addition to, and a more serious objection than this loss, is the volume of smoke produced, which makes it impossible for the workmen to handle the furnaces, so that it cannot be handled in its crude state.

The usual method of treating these sal-ammoniac-skimmings is to allow them to remain exposed to the weather, in a shallow pile, for three to eight months, which is called "weathering." In this exposure most of the soluble chloride of zinc is washed away by the rain and lost, and some becomes converted into oxide of zinc, which, together with some chloride of zinc and the metallic pellets of zinc, constitute "weathered sal-ammoniac skimmings." These are roasted in a reverberatory furnace, so that the remaining chloride of zinc is driven off in order to prevent the smoke, while the calcined skimmings are then treated as ore in the manufacture of zinc. The process is objectionable because of the loss of chloride of zinc and the great time required to perform it, and necessitates, in establishments using it largely, an extensive storage-room and a large investment of money in the skimmings for that length of time.

The object of this invention is to save the soluble chloride of zinc lost by the old method, and to accomplish the decomposition of the skimmings in from three to six days, while by the old method from three to eight months were required. A three months' use of my improved process, hereinafter described, on a large scale has resulted not only in a great gain of time, but has demonstrated that the weathering is better done than by the old process—that is to say, a smaller percentage of chloride of zinc is driven off in the roasting from the skimmings treated by this process than in the best weathered skimmings by the old method. By my improved process the sal-ammoniac or flux skimmings from the galvanizer's bath may therefore be rapidly converted into a valuable ore for the zinc-manufacturer, while the chloride of zinc is dissolved and obtained as a by-product; and the invention consists of subjecting said skimmings to the decomposing action of steam and saving the liquid as well as the solid resultants.

Figure 2:
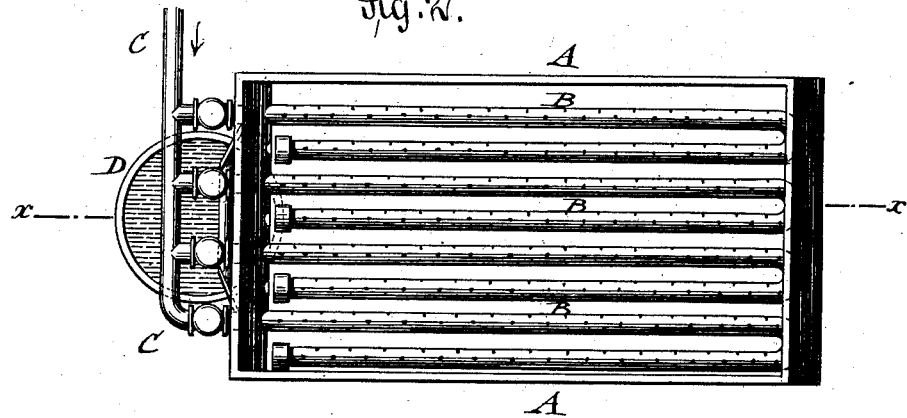

In the accompanying drawings, Figure 1 represents a vertical longitudinal section on line $x$ $x$, Fig. 2; and Fig. 2 a plan of the apparatus by which my improved process of treating sal-ammoniac-skimmings is carried out.

Similar letters of reference indicate corresponding parts.

The apparatus consists of a box, A, of suitable size, according to the quantity of skimmings to be treated, which box is arranged in somewhat inclined position and provided at the bottom with a number of pipes, B, that are perforated at the top and sides. The pipes B are connected with a pipe, C, through which waste or live steam is admitted, and have stop-cocks C', so that the steam emitted from the pipes passes upward through the material in the box and is brought into intimate contact with every portion of the raw skimmings, which consist wholly or partially of chloride of zinc. By the condensation of the steam a portion of the chloride of zinc is dissolved, the solution flowing down along the inclined bottom of the box and passing out through openings *a* at the lower end, and is collected in a tank, D. The solution consists of chloride of zinc of different densities, according to the quantity of steam admitted and the quality of the skimmings acted upon. By allowing this solution to stand for a few hours a quantity of zinc settles at the bottom of the tank, said zinc consisting of a mixture of oxide and chloride of zinc. The supernatant liquor of chloride of zinc is removed, while the oxide-of-zinc sediment is added to the material in the box. The solution of chloride of zinc may be concentrated and used directly as a disinfectant.

At the end of from three to seven days, according to the quantity of steam used, the material in the box will be found to have changed entirely in character, being comparatively free from chloride of zinc and consisting principally of oxide of zinc. The material is then removed from the box and calcined in any suitable furnace, so as to be converted entirely into oxide of zinc. By this calcining the chlorides are volatilized and may be condensed in any suitable manner, while the oxide of zinc is charged into a spelter-furnace in the usual manner and a superior quality of spelter produced therefrom.

Flux-skimmings have heretofore been boiled in a water bath heated by free steam; but in my invention the skimmings are not immersed in water, and the condensed vapor of the steam is continually drawn off from the mass of skimmings being treated during the admission of the steam to the mass. By subjecting the skimmings to the direct action of steam alone, without the intermediate water bath, less steam is required for extracting the chlorides, the steam thoroughly permeates as steam the mass of skimmings, and the chlorides are extracted more rapidly, at less expense, and with a comparatively small apparatus or plant.

Having thus described my invention, I claim as new and desire to secure by Letters Patent—

1. The process herein described of treating sal-ammoniac or flux skimmings, which consists in subjecting the raw skimmings to the action of steam and simultaneously draining off the condensed vapor containing the soluble chlorides of zinc, substantially as set forth.

2. The process herein described of treating sal-ammoniac or flux skimmings, which consists in subjecting the raw skimmings to the action of steam and simultaneously draining off the condensed vapor containing the soluble chlorides of zinc, then calcining the drained skimmings and then reducing the calcined skimmings, substantially as set forth.

In testimony that I claim the foregoing as my invention I have signed my name in presence of two subscribing witnesses.

GEORGE G. CONVERS.

Witnesses:
ELIZABETH A. KRAUSE,
JOHN C. WEBER.